United States Patent Office 2,967,175
Patented Jan. 3, 1961

2,967,175
METHOD FOR PREPARING A POLYAMPHOLYTE

Robert M. Summers, Scotia, N.Y., assignor to The B. F. Goodrich Company, New York, N.Y., a corporation of New York No Drawing. Filed Oct. 13, 1958, Ser. No. 766,648
9 Claims. (Cl. 260—80)

This invention relates to a novel method for preparing polymeric amino acids and more particularly pertains to the process for preparing polymers containing primary amine and carboxyl groups by the amidification of polymeric anhydrides and the rearrangement or degradation of the resulting amide groups.

Polymers containing both primary amine groups and carboxyl groups are known in the art. The methods employed in the production of these polyamino acids generally have been tedious and expensive. Many of the previously known polyamino acids are composed of random groupings of amine and carboxyl groups having little or no reptitive order along the polymer chain. Generally, polyamino acids are amphoteric in nature, that is, they are capable of forming salts with both acidic and basic materials. In this respect the synthetic polyamino acids resemble the natural protein polymers. The synthetic protein-like amphoteric polymers are useful as replacements for natural protein polymers in many applications because of their greater uniformity and also because the synthetic amphoteric polymers are more resistant to hydrolytic attack by bacteria, fungus and the like.

Accordingly, it is an object of the present invention to provide a method for preparing synthetic amphoteric polymers in a simple two-step process. Another object is the provision of a method for preparing amphoteric polymers which have an ordered arrangement of amine groups and acid groups along the polymer chain. Another object is the provision of a simple method for preparing synthetic amphoteric polymers which can be employed as replacements in many uses for natural protein polymers such as casein and the like.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

I have discovered a novel method for preparing polymers containing a plurality of primary amine and carboxyl groups comprising converting a plurality of the anhydride groups present in a polymeric anhydride to partial amide groups with ammonia and converting a plurality of said amide groups to primary amine groups with a hypohalite.

The polymeric anhydrides of alpha, beta unsaturated monocarboxylic acids or acrylic or substituted acrylic acids have a series of recurring

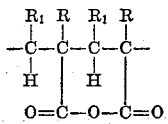

units. In the above formula R represents hydrogen, chlorine, fluorine, bromine, a cyano group, an alkyl group having from 1 to about 10 carbon atoms, an aryl group, an aralkyl group, or an alkaryl group and $R_1$ represents hydrogen, chlorine, bromine and fluorine. Thus, the polymer is a polymeric anhydride of acrylic acid or a substituted derivative thereof. When the anhydride polymer reacts with ammonia the anhydride group is ruptured and the reaction is controlled so that only one of the acyl groups is amidified and the other acyl group becomes a carboxylic acid group or the salt of a carboxylic acid group of the following type

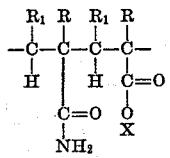

wherein R and $R_1$ have the aforementioned designations and X represents hydrogen and —$NH_4$.

The polymeric anhydrides are converted to their partial amides by treating them with ammonia in the dry state, in solution or in suspension at temperatures of from about 25° C. and lower to 100° C. and higher. The polymeric anhydride can be exposed to ammonia vapors or to liquid ammonia to effect amide formation, the polymeric anhydride can be dissolved in a solvent such as water containing ammonia or the anhydride polymer can be suspended in a non-solvent for the polymer containing ammonia.

The preferred method of this invention, because of ease of handling and because it affords the most complete reaction between the ammonia and the anhydride polymer, is the last-mentioned method and the preferred temperature range is from about 25° C. to about 80° C. According to the preferred embodiment of this invention the polymeric anhydride is suspended and allowed to react with ammonia in an inert organic diluent, preferably a hydrocarbon or substituted hydrocarbon and most preferably an aromatic hydrocarbon or substituted aromatic hydrocarbon such as benzene, toluene, xylene, chlorobenzene, bromobenzene, nitrobenzene, and the like. The proportion of amide groups in the resulting product is determined by the proportion of anhydride groups present in the original polymer and the amount of ammonia which is used in the amidification reaction. From as little as 1% or less to as much as 50% of the anhydride acyl groups present in a given anhydride polymer can be converted to amide groups by the method of this invention.

The amine groups are attached to the polymer chain by the rearrangement or degradation of the amide groups in the partial amide polymer. The reaction is effected by the action of a hypohalite salt on the amide group. This rearrangement is more commonly called a Hofmann reaction. The hypohalite salts useful in this invention are the alkali and alkaline earth metal hypohalites such as lithium hypofluorite, lithium hypochlorite, lithium hypobromite, lithium hypoiodite, sodium hypofluorite, sodium hypochlorite, sodium hypoiodite, sodium hypobromite, potassium hypochlorite, potassium hypobromite, potassium hypofluorite, potassium hypoiodite, cesium hypochlorite, rubidium hypochlorite, calcium hypobromite, barium hypobromite, magnesium hypochlorite and the remaining alkali metal and alkaline earth metal hypohalites. Preferred are the alkali metal hypohalites and most preferred are the alkali metal hypochlorites and hypobromites.

The reaction involving the rearrangement of the amide group to an amine group is carried out at temperatures of from 0° C. and lower to 50° C. and higher preferably by adding the hypohalite to the amide polymer and most preferably by adding an aqueous solution of the hypohalite to an aqueous solution of the alkali metal salt of the polymeric amide polymer at from about 0° C. to about 20° C.

The products of the process of this invention are usually isolated by precipitating them with acid near the pH at which they exhibit an isoelectric point or point of minimum solubility. This point of minimum solubility will vary among polymers because it is dependent upon the percentage of original anhydride acyl groups in the polymer ultimately converted to primary amine groups.

The polymeric products of the present invention have a plurality of

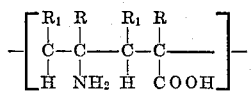

and

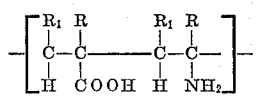

groups in the polymer chain. Both of the above structures represent an alpha-carboxyl, gamma-amino unit. The products of the process of this invention are useful as stabilizers in latex paint formulations, as additives and emulsion stabilizers in photographic films, as adhesives and coating agents and the like.

In the following illustrative examples the amounts of ingredients are expressed in parts by weight unless otherwise indicated.

*Example I*

To a mixture of about 10% glacial acrylic acid and 90% benzene was added a mole of acetic anhydride for each mole of acrylic acid. Sufficient benzoyl peroxide was added to provide a final concentration of 2% by weight based on the acrylic acid. Air was swept out of the polymerization flask with nitrogen, the flask was sealed and the temperature was adjusted to 50° C. After about 16 hours the reaction was complete and the linear polyacrylic anhydride formed as a white, fluffy powder suspended in benzene. The polymer was filtered, washed with fresh benzene and dried in a vacuum oven at 50° C.

The partial amide of polyacrylic anhydride was prepared by slowly distilling 17 parts of anhydrous ammonia into a stirred slurry of 126 parts of the above-described polyacrylic anhydride in 1320 parts of benzene. The exothermic reaction which occurred during the addition of the ammonia caused the temperature of the reaction mixture to rise from about 25° C. to about 34° C. After the addition of the ammonia was completed the reaction mixture was maintained at room temperature in a sealed container for 16 hours. The slurry was then maintained at a temperature of from 45 to 50° C. under a Dry Ice-acetone condenser for about 2 hours. The suspension then was cooled and 140 parts of the solid powdery polymeric amide was isolated by filtration and was washed with fresh benzene prior to vacuum drying at 50° C. The partial amide polymer was found to contain 9.29% nitrogen and 6.74 milliequivalents per gram of carboxyl which is in excellent agreement with the calculated values of 9.79% nitrogen and 6.99 milliequivalents per gram of carboxyl for the complete half amide of polyacrylic anhydride.

A typical solution of sodium hypochlorite of the type used in the examples herein was prepared by adding slowly 115 parts of chlorine to a mixture of 140 parts of sodium hydroxide and 1213 parts of ice and water.

The polyamino acid was prepared by dissolving 128.7 parts of the above-described polyamide in 1500 parts of distilled water containing 36 parts of sodium hydroxide and bubbling air through the solution for two hours. The resulting solution was then cooled to about 0° C. and 806 parts of an 8.32% by weight solution of sodium hypochlorite containing an additional 36 parts of sodium hydroxide were added dropwise over a period of from 20 to 30 minutes. The resulting solution was allowed to stand at room temperature for 16 hours and was then cooled and acidified to a pH of about 4 with concentrated hydrochloric acid. The gum which coagulated was collected and was redispersed in 1500 parts of warm water. The polymer was reprecipitated by acidifying the water solution with concentrated hydrochloric acid. 80 grams of vacuum dried polyamino acid were isolated. The polyamino acid was found by analysis to contain 6.34% nitrogen (Kjeldahl), 0.39% nitrogen by alkaline hydrolysis and 6.68 milliequivalents per gram of carboxyl indicating that about one-fourth of the acyl groups present in the original polyacrylic anhydride had been converted to primary amine groups. The polyamino acid was found to be soluble in water in both basic and acidic ranges but insoluble at a pH of about 4. A sample of the original polyacrylic anhydride was allowed to dissolve and hydrolyze in distilled water and the resulting polyacrylic acid was found to be soluble at all pH's with no observable isoelectric point. The polyamino acid of this example was found to be an excellent protective colloid in a butadiene-styrene latex paint formulation and it served as an adhesive for wood-to-wood surfaces.

*Example II*

An aqueous solution of sodium hypobromite was prepared in a manner similar to that described for the preparation of sodium hypochlorite in Example I.

To a solution of 33 parts of the half amide of polyacrylic anhydride described in Example I in 350 parts of water was added slowly a solution of 16 g. of sodium hydroxide in water. Air was then bubbled through the resulting solution for about 2 hours while the temperature was held below 40° C. A solution of sodium hypobromite resulting from the reaction of 36 parts of sodium hydroxide, 300 parts of distilled water and 64 parts of bromine was added dropwise to the reaction solution while the temperature was held below 6° C. The resulting solution was allowed to stand at room temperature for 16 hours. The reaction mixture was then heated at 65–75° C. for 2 hours, cooled to about 3° C. and the product was precipitated by the addition of 20 ml. of concentrated hydrochloric acid. The polymeric amino acid was redissolved in water and reprecipitated with acid and vacuum dried. The polyamino acid of this example was useful as an adhesive for and coating on wood, paper, leather and other similar surfaces.

*Example III*

Polymethacrylic anhydride was prepared from methacrylic acid and acetic anhydride in benzene in a manner similar to that described for the preparation of polyacrylic anhydride in Example I.

The partial amide of polymethacrylic anhydride was also prepared according to the procedure given for the preparation of the partial amide of polyacrylic anhydride in Example I.

A solution of 18 parts of the partial amide of polymethacrylic anhydride and 4 parts of sodium hydroxide in 200 parts of water was cooled to about 0° C. and an aqueous solution containing about 7.5 parts of sodium hypochlorite and 4 parts of sodium hydroxide was added dropwise thereto. The reaction temperature was maintained below 5° C. during the addition which required about 30 minutes. The resulting solution was held at room temperature for 16 hours and was then heated at 70–80° C. for 1½ hours. The product was isolated by cooling the reaction mixture and adding acid until the polymer precipitated. The product was an excellent stabilizer for a paint formulation employing a high styrene-butadiene latex and titanium dioxide pigment.

The embodiments of the invention in which an exclusive property or privilege is claimed are defined as follows:

1. The method for preparing polymers containing a plurality of primary amine and carboxyl groups comprising converting from 1 to 50% of the acyl groups present in a homopolymeric anhydride of an alpha,beta-olefinically unsaturated monocarboxylic acid to partial amide groups with ammonia at a temperature of from about 25° C. to about 100° C. and converting a plurality of said amide groups to primary amine groups with a hypohalite in water at a temperature of from about 0° C. to about 50° C.

2. The method for preparing polymers containing a plurality of alpha-carboxyl, gamma-primary amino units comprising converting from 1 to 50% of the acyl groups present in a homopolymeric anhydride of an alpha,beta-olefinically unsaturated monocarboxylic acid to partial amide groups with ammonia at a temperature of from about 25° C. to about 100° C. and converting a plurality of said amide groups to primary amine groups with an alkali metal hypohalite in water at a temperature of from about 0° C. to about 50° C.

3. The method for preparing polymers containing a plurality of alpha-carboxyl, gamma-primary amino units comprising converting from 1 to 50% of the acyl groups present in a homopolymeric anhydride of an alpha,beta-olefinically unsaturated monocarboxylic acid to partial amide groups with ammonia at a temperature of from about 25° C. to about 100° C. in an aromatic hydrocarbon diluent and converting a plurality of said amide groups to primary amine groups with an alkali metal hypohalite in water at a temperature of from about 0° C. to about 50° C.

4. The method of claim 3 wherein the alpha,beta-olefinically unsaturated acid is acrylic acid.

5. The method of claim 3 wherein the alpha,beta-olefinically unsaturated acid is methacrylic acid.

6. The method of claim 3 wherein the aromatic hydrocarbon diluent is benzene.

7. The method for preparing polymers containing a plurality of alpha-carboxyl, gamma-primary amino units comprising converting from 1 to 50% of the acyl groups present in a homopolymeric anhydride of acrylic acid to partial amide groups with ammonia at a temperature of from about 25° C. to about 80° C. in benzene and converting a plurality of said amide groups to primary amine groups with an alkali metal hypohalite in water at a temperature of from about 0° C. to about 25° C.

8. The method of claim 7 wherein the alkali metal hypohalite is sodium hypochlorite.

9. The method of claim 7 wherein the alkali metal hypohalite is sodium hypobromite.

References Cited in the file of this patent

UNITED STATES PATENTS

| | | |
|---|---|---|
| 2,313,565 | McDowell et al. | Mar. 9, 1943 |
| 2,729,560 | House et al. | Jan. 3, 1956 |

OTHER REFERENCES

Arcus: Journal of Polymer Science, vol. 8, #4, pages 365–370 (1952).

Vrancken et al.: Journal of Polymer Science, vol. 14, pages 521–534 (1954).